(12) United States Patent
Itoh et al.

(10) Patent No.: US 6,720,376 B2
(45) Date of Patent: Apr. 13, 2004

(54) THERMOPLASTIC ELASTOMER COMPOSITION WITH HIGH RESISTANCE TO THERMAL DETERIORATION

(75) Inventors: Yuichi Itoh, Chiba (JP); Akira Uchiyama, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/959,968

(22) PCT Filed: Apr. 6, 2001

(86) PCT No.: PCT/JP01/03000

§ 371 (c)(1),
(2), (4) Date: Nov. 14, 2001

(87) PCT Pub. No.: WO01/77221

PCT Pub. Date: Oct. 18, 2001

(65) Prior Publication Data

US 2002/0183429 A1 Dec. 5, 2002

(30) Foreign Application Priority Data

Apr. 7, 2000 (JP) ........................................ 2000-107004

(51) Int. Cl.[7] ........................ C08L 23/04; C08L 23/12; C08K 5/138
(52) U.S. Cl. ........................................ 524/352; 524/474
(58) Field of Search ................................ 524/352, 474

(56) References Cited

U.S. PATENT DOCUMENTS

| 6,020,046 A | 2/2000 | Abhau |
| 6,346,577 B1 * | 2/2002 | Hakuta et al. ............... 525/192 |
| 6,486,258 B1 | 11/2002 | Noguchi et al. |

FOREIGN PATENT DOCUMENTS

| EP | 0 482 778 A2 | 4/1992 |
| EP | A2 0 603 724 | 6/1994 |
| JP | 05 287132 A | 2/1993 |
| JP | A5-220825 | 8/1993 |
| JP | A8-100090 | 4/1996 |
| JP | A9-95577 | 4/1997 |
| WO | WO99/65980 A | 12/1999 |

* cited by examiner

Primary Examiner—James J. Seidleck
Assistant Examiner—Umakant Rajguru
(74) Attorney, Agent, or Firm—Birch, Stewart, Kolasch & Birch, LLP

(57) ABSTRACT

This invention relates to a thermoplastic elastomer composition which includes and comprises 10 to 60 parts by weight of a polyolefin (A), 30 to 87 parts by weight of a crosslinked rubber (B), 3 to 50 parts by weight of a softening agent (C) [the total amount of (A), (B) and (C) being 100 parts by weight] and 0.02 to 0.3 part by weight of a phenolic heat stabilizer (D) and which retains an elongation value at break by 80% or more, after aging for 500 hours in an air oven of 130° C., of the value before the aging; and relates to a manufacturing method thereof.

15 Claims, No Drawings

THERMOPLASTIC ELASTOMER COMPOSITION WITH HIGH RESISTANCE TO THERMAL DETERIORATION

This application is the national phase under 35 U.S.C. §371 of PCT International Application No. PCT/JP01/03000 which has an International filing date of Apr. 6, 2001, which designated the United States of America.

TECHNICAL FIELD

The present invention relates to a thermoplastic elastomer composition, particularly to a thermoplastic elastomer composition that can provide a molding superior in heat-aging resistance.

BACKGROUND ART

For the skin materials of interior parts of automobile instrumental panels, door trims and the like, soft poly(vinyl chloride) resins have heretofore been used mainly. However, from the viewpoint of seeking lightness of materials in recent years, olefinic thermoplastic elastomers has begun to be used.

In the case of passenger cars, higher heat-aging resistance has begun to be required because, though the temperature of the inside of cars shut tightly becomes considerably high especially under the blazing sun in summers, the recent inclination in the design of passenger cars is to use large-sized front glasses and this entails that the temperature of the skin of instrumental panels is elevated.

In order to improve the heat-aging resistance, usually heat stabilizers (antioxidants) are incorporated. This, however, raises the problem, causing the phenomenon called "bleed-out", in that, depending to formulated amounts, the heat stabilizers ooze out from the inside to the surface and damage the appearance.

DISCLOSURE OF THE INVENTION

The present invention is to solve the problem as mentioned above accompanying the prior art. The first object of the present invention is to provide a thermoplastic elastomer composition that can give a molding excellent in heat-aging resistance. The second object of the present invention is to provide a thermoplastic elastomer composition that has the restrained bleed-out phenomenon.

The present invention includes the following inventions.

(1) A thermoplastic elastomer composition which comprises 10 to 60 parts by weight of a polyolefin (A), 30 to 87 parts by weight of a crosslinked rubber (B), 3 to 50 parts by weight of a softening agent (C) [the total amount of (A), (B) and (C) being 100 parts by weight] and 0.02 to 0.3 part by weight of a phenolic heat stabilizer (D) and which retains an elongation value at break by 80% or more, after aging for 500 hours in an air oven of 130° C., of the value before the aging.

(2) A thermoplastic elastomer composition as defined in the above (1), wherein the softening agent (C) is a paraffinic mineral oil.

(3) A thermoplastic elastomer composition as defined in the above (1) or (2), wherein the softening agent (C) has an aniline point of 140° C. or below and a sulfur content of 20 ppm or more.

(4) A thermoplastic elastomer composition as defined in any one of the above (1) to (3), wherein the softening agent (C) has a kinetic viscosity of 150 to 1000 cSt at 40° C.

(5) A thermoplastic elastomer composition as defined in any one of the above (1) to (4), which further contains 0.02 to 0.3 part by weight of a heat stabilizer other than the phenolic type.

(6) A thermoplastic elastomer composition as defined in the above (5), wherein the heat stabilizer other than the phenolic type is a sulfur-containing heat stabilizer.

(7) A thermoplastic elastomer composition as defined in any one of the above (1) to (6), which is produced by dynamically heat treating at least the whole of the crosslinked rubber (B) and part or the whole of the polyolefin (A) in the presence of a crosslinking agent.

(8) A thermoplastic elastomer composition as defined in any one of the above (1) to (7), wherein the crosslinked rubber (B) is at least one rubber selected from the group consisting of ethylene-α-olefin-non-conjugated polyene copolymer rubbers, ethylene-α-olefin copolymer rubbers, isoprene rubbers or hydrogenated products thereof, butadiene rubbers or hydrogenated products thereof, styrene-butadiene rubbers or hydrogenated products thereof, styrene-isoprene rubbers or hydrogenated products thereof, chloroprene rubbers, butyl rubbers, halogenated butyl rubbers, acrylonitrile-butadiene rubbers, chlorinated polyethylene rubbers, fluororubbers, silicone rubbers, polysulfide rubbers and urethane rubbers.

(9) A thermoplastic elastomer composition as defined in any one of the above (1) to (8), wherein the polyolefin (A) is a polymeric resin based on propylene and the crosslinked rubber (B) is an ethylene-α-olefin-non-conjugated polyene copolymer rubber.

(10) A thermoplastic elastomer composition as defined in any one of the above (1) to (9), wherein the rubber is crosslinked by an organic peroxide.

(11) A thermoplastic elastomer composition as defined in any one of the above (1) to (10), which is produced by using a twin screw extruder.

(12) A method for producing a thermoplastic elastomer composition, which is characterized by dynamically heat treating 10 to 60 parts by weight of a polyolefin (A), 30 to 87 parts by weight of a rubber (B'), 3 to 50 parts by weight of a softening agent (C) [the total amount of (A), (B') and (C) being 100 parts by weight] and 0.02 to 0.3 part by weight of a phenolic heat stabilizer (D) in the presence of a crosslinking agent.

Hereinafter the thermoplastic elastomer composition according to the present invention will be explained in detail.

The thermoplastic elastomer of the present invention is a composition including and comprising a polyolefin (olefinic resin) (A), a crosslinked rubber (B), a softening agent (C), a phenolic heat stabilizer (D) and a heat stabilizer other than the phenolic type, for example, a sulfuric stabilizer (E) incorporated where deemed necessary.

Polyolefin (Olefinic Resin) (A)

The polyolefin (olefinic resin) (A) used in the present invention usually comprises a polymeric solid product obtained by polymerizing one or more of monoolefin through a high pressure or low pressure method. Such resins include, for example, isotactic and syndiotactic polymeric resins of monoolefin. The typical resins of these are commercially available.

As suitable raw material olefins for the above-mentioned polyolefins (A), there are enumerated preferably α-olefins having 2 to 20 carbon atoms, concretely, ethylene, propylene, 1-butene, 1-pentene, 1-hexene, 1-octene, 1-decene, 2-polyene polyene copolymer rubbers, ethylene- α-olefin copolymer rubbers, isoprene rubbers or hydrogenated products thereof, butadiene rubbers or hydrogenated products thereof, styrene-butadiene rubbers or hydrogenated products thereof, styrene-isoprene rubbers or hydrogenated products thereof, chloroprene rubbers, butyl rubbers, halogenated butyl rubbers, acrylonitrile-butadiene rubbers, chlorinated polyethylene rubbers, fluororubbers, silicone rubbers, polysulfide rubbers and urethane rubbers. Herein, the term "hydrogenated product" indicates a product in which the whole or part of the double bonds are saturated by hydrogen addition treatment.

Among these, ethylene-α-olefin-non-conjugated polyene copolymer rubbers are favorable, and particularly favorable are ethylene-propylene-non-conjugated diene rubbers having the following properties.

Ethylene/propylene ratio: 50/50 to 90/10 (molar ratio)
Iodine value: 3 to 30 (g/100 g)
Mooney viscosity $ML_{1+4}$ (100° C.): 15 to 250

The non-conjugated dienes used for the above-mentioned ethylene-propylene-non-conjugated diene rubbers include, concretely, cyclic dienes such as dicyclopentadiene, cyclooctadiene, methylenenorbornene (for example, 5-methylene-2-norbornene), ethylidenenorbornene (for example, 5-ethylidene-2-norbornene), methyltetrahydroindene, 5-vinyl-2-norbornene, 5-isopropylidene-2-norbornene, 6-chloromethyl-5-isopropenyl-2-norbornene, norbornadiene; and chain dienes such as 1,4-hexadiene, 3-methyl-1,4-hexadiene, 4-methyl-1,4-hexadiene, 5-methyl-1,4-hexadiene, 4,5-dimethyl-1,4-hexadiene, 6-methyl-1,6-octadiene, 7-methyl-1,6-octadiene, 6-ethyl-1,6-octadiene, 6-propyl-1,6-octadiene, methyl-1-propene, 3-methyl-1-pentene, 4-methyl-1-pentene and 5-methyl-1-hexene. These olefins are used alone or in a mixture of two or more.

The polymerization mode can be either random or block mode as long as a resinous substance is obtained.

These polyolefins can be used singly or in a combination of two or more.

Among these polyolefins particularly preferable are polymers based on propylene, to mention concretely, propylene homopolymers, propylene-ethylene block copolymers, propylene-ethylene random copolymers and propylene-ethylene-butene random copolymers.

The polyolefins (A) used in the present invention usually have a MFR (ASTM D1238-65T, 230° C., 2.16 kg load) of 0.01 to 100 g/10 min., preferably one within the range from 0.05 to 50 g/10 min.

The above-mentioned polyolefins (A) play a role of improving flow property and heat resistance of the composition.

In the present invention, the polyolefin (A) is used in a ratio of 10 to 60 parts by weight, preferably 15 to 50 parts by weight to the total 100 parts by weight of the polyolefin (A), crosslinked rubber (B) and softening agent (C). By using the polyolefin (A) in a ratio as above-mentioned, there is obtained a thermoplastic elastomer composition excellent in moldability/processability as well as excellent in flexibility and rubbery elasticity.

Crosslinked Rubber (B)

As the crosslinked rubbers (B) employed in the present invention, usually used is a rubber of at least one kind selected from the group consisting of ethylene-α-olefin-non-conjugated 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene and 7-methyl-1,6-octadiene.

In the present invention the crosslinked rubber (B) is used in a proportion of 30 to 87 parts by weight, preferably 35 to 70 parts by weight to the total 100 parts by weight of the polyolefin (A), crosslinked rubber (B) and softening agent (C).

Softening Agent (C)

The softening agents (C) used in the present invention can be softening agents usually used for rubbers. Concrete examples include petroleum softening agents, such as process oil, lubricating oil, paraffin oil, liquid paraffin, petroleum asphalt and vaseline; coal tar softening agents, such as coal tar and coal tar pitch; fatty oil, such as castor oil, linseed oil, rape oil, soybean oil and coconut oil; tall oil; waxes, such as beeswax, carnauba wax and lanolin; fatty acids or metal salts thereof, such as ricinolic acid, palmitic acid, stearic acid, barium stearate, calcium stearate and zinc laurate; synthetic high molecular weight substances, such as terpene resin, petroleum resin, coumarone-indene resin and atactic polypropylene; ester softening agents, such as dioctyl phthalate, dioctyl adipate and dioctyl sebacate; microcrystalline wax; rubber substitute (factice); liquid polybutadiene; modified liquid polybutadiene; liquid Thiokol™.

Of these softening agents, hydrocarbon type softening agents are preferable, and more preferable are mineral oils, for examples, paraffinic mineral oils, naphthenic mineral oils and aromatic mineral oils. And the paraffinic mineral oils are most preferable.

The paraffinic mineral oil is a paraffinic process oil usually used as a softening agent for rubbers and a paraffinic lubricating fraction obtained by purifying mineral oils.

The paraffinic mineral oil preferably used in the present invention has desirably a CP percentage (%CP) of 50 or more, more preferably 60 to 80 in ring analysis, a total acid number of 0.05 (mgKOH/g) or less, preferably 0.01 or less, an aniline point of 100 to 160° C., preferably 120 to 150° C. and a kinetic viscosity at 40° C. of 150 to 1000 cSt, more preferably 200 to 500 cSt.

Further, if there is used, as the softening agent (C), a paraffinic mineral oil which has an aniline point of 140° C. or below and a sulfur content of 20 ppm or more, the bleed-out phenomenon is specially suppressed. From the point of suppressing the bleed-out phenomenon, the aniline point is preferably 100 to 140° C., more preferably 120 to 140° C., and the sulfur content is preferably 20 to 10,000 ppm, more preferably 100 to 5,000 ppm. Such observed suppression of the bleed-out phenomenon is considered attributable to the point that the softening agent satisfying the above parameters has high compatibility with the phenolic compound, polar substance used as the phenolic heat stabilizer (D), and the phenolic heat stabilizer is strongly fixated in the elastomer composition.

Further, if the heat stabilizer other than the phenolic type is a polar substance, the bleed-out phenomenon due to it will be restrained by the same mechanism.

The naphthenic mineral oil means one that has a %CP of 50 or less and a %CN of about 35 or more in the ring analysis. The aromatic mineral oil indicates one that has a %CP of 50 or less and a %CA of about 35 or more.

In the present invention the softening agent (C) is used in a ratio of 3 to 50 parts by weight, preferably 10 to 40 parts by weight to the total 100 parts by weight of the polyolefin (A), crosslinked rubber (B) and softening agent (C).

In the present invention the softening agent (C) may be either added at the time of manufacturing the thermoplastic elastomer or oil extended in advance in the raw material rubber.

The value of the aniline point of the softening agent (C) in the present Specification is one measured by the test tube method prescribed in JIS K2256 and the value of the sulfur content is one measured by the microcoulometric titration oxidation method prescribed in JIS K2541.

Phenolic Heat Stabilizer (D)

The phenolic stabilizer (D) used in the present invention is an organic compound having the phenol structure in the molecule and having the function of capturing radicals. As the phenolic heat stabilizer (D) used in the present invention, concretely enumerated are 2-tert-butyl-4-methoxyphenol, 2-tert-butyl-4,6-dimethoxyphenol, 3,5-di-tert-butyl-4-hydroxytoluene, 4-hydroxymethyl-2,6-di-tert-butylphenol, 2,4,6-tri-tert-butylphenol, 2,2'-methylene-bis(4-ethyl-6-tert-butylphenol), 4,4'-butylidene-bis(6-tert-butyl-m-cresol), 2,2'-methylene-bis(4-methyl-6-cyclohexylphenol), 4,4'-bis(2,6-di-tert-butylphenol), 2,2'-dihydroxy-3,3'-bis(α-methylcyclohexyl)-5,5'-dimethyldiphenylmethane, 4,4'-methylene-bis(2,6-di-tert-butylphenol), d,l -α-tocopherol (vitamin E), 2,6-bis(2-hydroxy-3-tert-butyl-5-methylbenzyl)-4-methylphenol, n-octadecyl 3-(4-hydoxy-3, 5-di-tert-butylphenyl)propionate, 1,3,5-tris(4-tert-butyl-3-hydroxy-2,6-dimethylbenzyl)-s-triazine-2,4,6-(1H, 3H, 5H)-trione, 1,3,5-trimethyl-2,4,6-tris(3,5-di-tert-butyl-4-hydroxyphenyl)benzylbenzene, 1,3,5-tris(4-hydroxy-3,5-di-tert-butylbenzyl)-s-triazine-2,4,6-(1H, 3H, 5H)-trione, tetrakis[methylene-3-(3,5-di-tert-butyl-4-hydroxyphenyl) propionate]methane, decamethylenedicarboxylic acid disalicyloylhydrazide, N,N'-bis[3-(3,5-di-tert-butyl-4-hydroxyphenyl)propionyl]hydrazine, 2,2'-oxyamide-bis-ethyl-3-(3,5-di-tert-butyl-4-hydroxyphenyl)propionate, 4,4'-thiobis(3-methyl-6-tert-butylphenol), 2,2'-thiobis(4-methyl-6-tert-butylphenol), bis(3-methyl-4-hydroxy-5-tert-butylbenzyl) sulfide, 4,4'-butylidene-bis(2-methyl-4-hydroxy-5-tert-butylphenyl)-2-laurylthioether, 6-(4-hydroxy-3,5-di-tert-butylanilino)-2,4-bis(octylthio)-1,3,5-triazine, 2,4-bis(4-hydroxy-3,5-di-tert-butylanilino)-6-(n-octylthio)-1,3,5-triazine. Of these, tetrakis[methylene-3-(3, 5-di-tert-butyl-4-hydroxyphenyl)propionate]methane is preferably used in particular.

In the present invention, the phenolic heat stabilizer (D) is used in a ratio of 0.02 to 0.3 part by weight, preferably 0.05 to 0.2 part by weight to the total 100 parts by weight of the polyolefin (A), crosslinked rubber (B) and softening agent (C).

Heat Stabilizer Other than Phenolic Type (E)

The thermoplastic elastomer composition of the present invention can have further improved heat-aging resistance by jointly using the phenolic heat stabilizer (D) and a heat stabilizer other than the phenolic type. As the heat stabilizer other than the phenolic type, though known heat stabilizers such as sulfur-containing heat stabilizer, phosphorus-containing heat stabilizer and amine (amine type) heat stabilizer can be employed, the sulfur-containing heat stabilizer is most preferable among them.

The sulfur-containing heat stabilizer used in the present invention is an organic compound having sulfur atom in the molecule and having the function of decomposing peroxides. The sulfur-containing heat stabilizer used in the present invention includes, concretely, 2-mercaptobenzimidazole, N,N'-diphenylthiourea, tetramethylthiuram disulfide, N-oxydiethylene-2-benzothiazolylsulfenamide, N-cyclohexyl-2-benzothiazolylsulfenamide, cyclohexylamine salt of 2-mercaptobenzothiazole, N,N-diisopropyl-2-benzothiazolylsulfenamide, 2-(N,N-diethylthiocarbamoylthio)benzothiazole, tetraethylthiuram disulfide, dibenzothiazyl disulfide, zinc diethyldithiocarbamate, zinc ethylphenyldithiocarbamate, zinc di-n-butyldithiocarbamate, dilauryl thiodipropionate, dilauryl thiodi-1,1'-methylbutyrate, dimyristyl 3,3'-thiopropionate, lauryl stearyl thiodipropionate, distearyl thiodipropionate, distearyl thiodibutyrate, dioctadecyl disulfide. Among these, particularly preferably used are zinc di-n-butyl dithiocarbamate, distearyl thiodipropionate, distearyl thiodibutyrate and dioctadecyl disulfide.

In the present invention, the heat stabilizer other than phenolic type (E), preferably a sulfur-containing heat stabilizer, is used in a proportion of usually 0.02 to 0.3 part by weight, preferably 0.05 to 0.2 part by weight to the total 100 parts by weight of the polyolefin (A), crosslinked rubber (B) and softening agent (C).

Other Components

The thermoplastic elastomer composition of the present invention may incorporate inorganic fillers and the like, other than the polyolefin (A), crosslinked rubber (B), softening agent (C), phenolic heat stabilizer (D) and heat stabilizer other than the phenolic type (E).

The above-mentioned inorganic fillers include, concretely, calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass balloon, shirasu balloon, basic magnesium sulfate whisker, calcium titanate whisker and aluminum borate whisker.

In the present invention, the inorganic filler is used in a proportion of usually 100 parts by weight or less, preferably 2 to 50 parts by weight to the total 100 parts by weight of the polyolefin (A), crosslinked rubber (B) and softening agent (C), from the standpoint of rubbery elasticity and moldability/processabilty of the obtained thermoplastic elastomer composition.

Moreover, in the present invention, the thermoplastic elastomer composition may incorporate hitherto known weather resisting agents, anti-static agents and lubricants such as metal soap, wax and silicone oil within such an extent not prejudicial to the object of the present invention.

The thermoplastic elastomer composition of the present invention can be obtained by blending the above-mentioned polyolefin (A), raw material rubber (B') for the crosslinked rubber (B), softening agent (C), predetermined heat stabilizer and optionally incorporated inorganic filler or the like and thereafter by dynamically heat treating in the presence of a crosslinking agent. Herein, the phrase "dynamically heat treating" indicates kneading in a molten state.

As the crosslinking agent used in the present invention, there are enumerated crosslinking agents generally used for heat curing type rubbers, such as organic peroxides, phenolic resins, sulfur, hydrosilicone compounds, amino resins, quinone or derivatives thereof, amine compounds, azo compounds, epoxy compounds and isocyanates.

The organic peroxide used in the present invention includes, concretely, dicumyl peroxide, di-tert-butyl peroxide, 2,5-dimethyl-2,5-di-(tert-butylperoxy)hexane, 2,5-dimethyl-2,5-di-(tert-butylperoxy)hexyne-3,1,3-bis (tert-butylperoxyisopropyl)benzene, 1,1-bis(tert-butylperoxy)-3,3,5-trimethylcyclohexane, n-butyl 4,4-bis (tert-butylperoxy)valerate, benzoyl peroxide, p-chlorobenzoyl peroxide, 2,4-dichlorobenzoyl peroxide, tert-butyl peroxybenzoate, tert-butylperoxyisopropylcarbonate, diacetyl peroxide, lauroyl peroxide and tert-butyl cumyl peroxide.

Of these, in the viewpoint of odor and scorch stability preferred are 2,5-dimethyl-2,5-di-(tert-butylperoxy)hexane, 2,5-dimethyl-2,5-di-(tert-butylperoxy)hexyne-3, 1,3-bis (tert-butylperoxyisopropyl)benzene. Among these, 2,5-dimethyl-2,5-di-(tert-butylperoxy)hexane is most preferable.

Such an organic peroxide is used in an amount to make usually 0.02 to 3 parts by weight, preferably 0.05 to 1.5 parts by weight to the total 100 parts by weight of the polyolefin (A), crosslinked rubber (B) and softening agent (C), from the standpoints of heat resistance, tensile properties, elastic recovery, impact resilience and moldability of the obtained thermoplastic elastomer composition.

Upon crosslinking treatment by the above organic peroxides, there can be incorporated crosslinking aids such as sulfur, p-quinone dioxime, p,p'-dibenzoylquinone dioxime, N-methyl-N-4-dinitrosoaniline, nitrosobenzene, diphenylguanidine, trimethylolpropane, N,N'-m-phenylene dimaleimide, divinylbenzene and triallyl cyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate.

By using the compounds as above-mentioned, uniform and mild crosslinking reaction can be expected. Particularly, in the present invention, divinylbenzene is most preferable. Divinylbenzene, since being easy to handle, since being good in compatibility with the polyolefin (A) and the rubber, such as ethylene-α-olefin-non-conjugated polyene copolymer rubber, which constitute the main component of the mass to be crosslinked, and since having a function of dissolving organic peroxides to work as dispersant thereof, produces the effect that the crosslinking by heat treatment is uniform to result in a thermoplastic elastomer composition balanced in flow and physical properties.

The compounds such as the above-mentioned crosslinking aids or polyfunctional vinyl monomers are used usually in an amount of 2 parts by weight or less, preferably 0.3 to 1 part by weight to the total 100 parts by weight of the polyolefin (A), crosslinked rubber (B) and softening agent (C).

To accelerate the decomposition of the organic peroxide, there may be used such decomposition accelerators as tertiary amines such as triethylamine, tributylamine and 2,4,6-tri(dimethylamino)phenol and naphthenates of aluminum, cobalt, vanadium, copper, calcium, zirconium, manganese, magnesium, lead, mercury and the like.

The dynamic heat treatment in the present invention is preferably conducted in a non-open type apparatus and under the atmosphere of inert gas such as nitrogen and carbon dioxide. The temperature of the heat treatment is in the range from the melting point of the polyolefin (A) to 300° C., usually 150 to 280° C., preferably 170 to 270° C. The kneading time is usually 1 to 20 minutes, preferably 1 to 10 minutes. The shearing force to be applied, in the terms of shearing velocity, is in the range usually from 10 to 50,000 sec$^{-1}$, preferably 100 to 20,000 sec$^{-1}$.

As the kneading apparatus, a mixing roll, intensive mixer (for example, Bumbury's mixer and kneader) and single screw or twin screw extruder can be used. However, a non-open type apparatus is preferable and a twin screw extruder is particularly favorable.

According to the present invention, by the above dynamic heat treatment, a thermoplastic elastomer composition can be obtained which comprises the polyolefin (A), crosslinked rubber (B) and the like.

In the present invention, that a rubber in a thermoplastic elastomer composition is crosslinked means the case where the gel content measured by the following method is 20% by weight or more, preferably 30% by weight or more, more preferably 50% by weight or more.

[Measurement of Gel Content]

A thermoplastic elastomer composition sample 100 mg is taken, cut into small pieces of 0.5 mm×0.5 mm×0.5 mm, dipped in 30 ml cyclohexane in a closed container at 23° C. for 48 hours, then taken out on a filter paper and dried at room temperature for 72 hours or more until a constant weight is obtained.

From the weight of the residue after drying there are subtracted the weight of all the cyclohexane insoluble components (fibrous filler, filler, pigment, etc.) other than the polymer component and the weight of the polyolefin (A) in the sample before cyclohexane immersion. The value obtained thus is named "corrected final weight (Y)".

On the other hand, the weight of the rubber in the sample is named "corrected initial weight (X)".

The gel content is obtained by the following formula.

Gel content[% by weight]=[corrected final weight (Y)/corrected initial weight (X)]×100

The thermoplastic elastomer composition according to the present invention is a high heat-aging resistant thermoplastic elastomer composition that retains 80% or more of the elongation value at break that it has before aging, after it has been subjected to aging in an air oven of 130° C. for 500 hours.

This specification includes part or all of the contents as disclosed in the specification of Japanese Patent Application 2000-107004, which is the base of the priority claim of the present application.

BEST MODE FOR CARRYING OUT THE INVENTION

The present invention will be explained hereinafter by way of examples which, however, should not be construed as limiting the scope of the present invention.

The methods of property measurements conducted for the thermoplastic elastomer compositions and the raw materials thereof in Examples and Comparative examples are as follows.

[Method of Property Measurement]

Tensile strength and elongation at break: measured according to the prescription of JIS K6301 at a tensile speed of 200 mm/min Bleed-out: The bleed-out property of stabilizers was evaluated, using the following criteria, on a pressed sheet that had been subjected to aging for 240 hours in a thermo-hygrostat kept at 40° C. and 95% humidity.
  3: Bleed-out of stabilizer is not recognized
  2: Bleed-out of stabilizer is slightly recognized, with the sheet surface becoming slightly white
  1: Bleed-out of stabilizer is clearly recognized, with the sheet surface becoming remarkably white.

Kinetic viscosity of softening agent: measured according to the prescription of JIS K2283.

Aniline point: measured by the test tube method specified in JIS K2256.

Sulfur content: measured by the microcoulometric titration oxidation method specified in JIS K2541.

%CP in ring analysis: measured according to the prescription of JIS K2536.

Total acid number: measured according to the prescription of JIS K2501.

Iodine value; The iodine value of copolymer rubbers was determined by the titration method.

Mooney viscosity: measured according the prescription of JIS K6300.

The raw materials mainly used in Examples and Comparative examples are as follows.

(A-1) propylene homopolymer: having a MFR(ASTM D1238-65T, 230° C., 2.16 kg) of 10 g/10 min.

(B-1) oil-extended ethylene-propylene-5-ethylidene-2-norbornene copolymer rubber: 100 parts by weight of a polymer (molar ratio of the unit derived from ethylene to the unit derived from propylene (ethylene/propylene)=79/21, iodine value=13, Mooney viscosity $ML_{1+4}$ (100° C.)=140) was oil-extended with 50 parts by weight of a paraffinic mineral oil (C-1, made by Idemitsu Kosan Co. Ltd., trade name PW-380, %CP in ring analysis=73, total acid number=0.01 mgKOH/g or less, aniline point=144° C., sulfur content=6 ppm, kinetic viscosity at 40° C.=382 cSt).

(B-2) oil-extended ethylene-propylene-dicyclopentadiene copolymer rubber: 100 parts by weight of a polymer (molar ratio of the unit derived from ethylene to the unit derived from propylene (ethylene/propylene)=80/20, iodine value=6, Mooney viscosity $ML_{1+4}$ (100° C.)=140) was oil-extended with 40 parts by weight of a paraffinic mineral oil (C-2, made by Idemitsu Kosan Co. Ltd., trade name PS-430, %CP in ring analysis=72, total acid number=0.01 mgKOH/g, aniline point=133° C., sulfur content=1600 ppm, kinetic viscosity at 40° C.=438 cSt)

(B-3) oil-extended ethylene-propylene-dicyclopentadiene copolymer rubber: 100 parts by weight of a polymer (molar ratio of the unit derived from ethylene to the unit derived from propylene (ethylene/propylene)=80/20, iodine value=6, Mooney viscosity $ML_{1+4}$ (100° C.)=140) was oil-extended with 40 parts by weight of a paraffinic mineral oil (C-1, made by Idemitsu Kosan Co. Ltd., trade name PW-380, %CP in ring analysis=73, total acid number=0.01 mgKOH/g or less, aniline point=144° C., sulfur content=6 ppm, kinetic viscosity at 40° C.=382 cSt)

EXAMPLE 1

There were put and fully blended in a Henschel mixer 25 parts by weight of pellets of propylene homopolymer (A-1), 75 parts by weight of pellets of oil-extended ethylene-propylene-5-ethylidene-2-norbornene copolymer rubber (B-1) (containing 50 parts by weight of rubbery polymer and 25 parts by weight of paraffinic mineral oil), 0.1 part by weight of phenolic heat stabilizer, i.e., tetrakis[methylene-3-(3,5-di-tert-butyl-4-hydroxyphenyl)propionate]methane (made by Ciba-Geigy Ltd., trade name Irganox 1010), 0.1 part by weight of sulfur-containing heat stabilizer, i.e., zinc di-n-butyldithiocarbamate, 0.4 part by weight of organic peroxide, i.e., 2,5-dimethyl-2,5-di-(tert-butylperoxy)hexane and 0.6 part by weight of divinylbenzene (DVB), and then fed to a twin screw extruder to conduct the dynamic heat treatment under the following conditions. Pellets of a thermoplastic elastomer were thus obtained.

Conditions of Dynamic Heat Treatment
Extruder: Werner & Pfleiderer type ZSK-53, screw diameter 53 mm
Temperature setting:
C1/C2/C3/C4/C5/D=140/160/180/220/220/200 (°C.)
Maximum shear rate: 2800 (sec$^{-1}$)
Extrusion through-put: 50 (kg/hour)

Then, the pellets were press molded at 190° C. (preheating 6 min., pressurizing 4 min., cooling 5 min.) into a sheet of 1 mm thickness, and by punching the sheet JIS-No.3 test pieces were prepared. Tensile strength and elongation at break were measured by conducting the tensile test according to the above measuring method. Further, after the punched JIS-No.3 dumbbell type specimens were aged for 500 hours in an air oven kept at 130° C., they were subjected to the measurement of tensile strength and elongation at break in the same way as described above. After the aging, change in appearance was visually observed and at the same time the color difference (ΔE) of samples before and after the aging was measured with a Hunter color-difference meter to evaluate discoloration due to the heat aging. Further, the gel content was measured according to the previously described method, and also the bleed-out property was evaluated. The results are shown in Table 1.

EXAMPLE 2

From 30 parts by weight of pellets of propylene homopolymer (A-1), 70parts by weight of pellets of oil-extended ethylene-propylene-dicyclopentadiene copolymer rubber (B-2) (containing 50 parts by weight of rubbery polymer and 20 parts by weight of paraffinic mineral oil), 0.1 part by weight of phenolic heat stabilizer, i.e., tetrakis[methylene-3-(3,5-di-tert-butyl-4-hydroxyphenyl)propionate]methane (made by Ciba-Geigy Ltd., trade name Irganox 1010), 0.1 part by weight of sulfur-containing heat stabilizer, i.e., distearyl thiodipropionate, 0.2 part by weight of organic peroxide, i.e., 2,5-dimethyl-2,5-di-(tert-butylperoxy)hexane and 0.3 part by weight of divinylbenzene (DVB), pellets of a thermoplastic elastomer were obtained by conducting the dynamic heat treatment with a twin screw extruder in the same manner as Example 1.

The pellets were press molded in the same way as Example 1 to prepare the test pieces of JIS-No.3 type, and tensile strength and elongation at break were measured in the same way as Example 1. Further, in the same manner as Example 1, the specimens were subjected to aging for 500 hours in an air oven kept at 130° C. and then brought to the measurement of tensile strength, elongation at break, appearance and color difference. Also, the gel content was measured and the bleed-out property was evaluated according to the methods described previously.

EXAMPLE 3

Except for adding 0.1 part by weight of bis(2,6-di-tert-butyl-4-methylphenyl)pentaerythritol-di-phosphite as phosphorus-containing heat stabilizer in place of the sulfur-containing heat stabilizer in Example 2, pellets of a thermoplastic elastomer were prepared in the same manner as Example 2 and the evaluation was conducted in the same manner as Example 2. The results are shown in Table 1.

EXAMPLE 4

There were added 30 parts by weight of pellets of propylene homopolymer (A-1), 70 parts by weight of pellets of oil-extended ethylene-propylene-dicyclopentadiene copolymer rubber (B-2) (containing 50 parts by weight of rubbery polymer and 20 parts by weight of paraffinic mineral oil), 0.1 part by weight of phenolic heat stabilizer, i.e., tetrakis[methylene-3-(3,5-di-tert-butyl-4-hydroxyphenyl)propionate]methane (made by Ciba-Geigy Ltd., trade name Irganox 1010), 0.1 part by weight of sulfur-containing heat stabilizer, i.e., zinc di-n-butyldithiocarbamate, 0.2 part by weight of organic peroxide, i.e., 2,5-dimethyl-2,5-di-(tert-butylperoxy)hexane and 0.3 part by weight of divinylbenzene (DVB), and the mixture was fully blended in a Henschel mixer and then fed to a twin screw extruder to conduct the dynamic heat treatment under the following conditions. Thus, pellets of a thermoplastic elastomer were obtained.

Conditions of Dynamic Heat Treatment

Extruder: Werner & Pfleiderer type ZSK-53, screw diameter 53 mm

Temperature setting:

C1/C2/C3/C4/C5/D=140/160/180/220/220/200 (°C.)

Maximum shear rate: 2800 (sec$^{-1}$)

Extrusion through-put: 50 (kg/hour)

Then, the pellets were press molded at 190° C. (preheating 6 min., pressurizing 4 min., cooling 5 min.) into a sheet 1 mm thickness, and by punching the sheet JIS-No.3 test pieces were prepared. Tensile strength and tensile elongation at break were measured by conducting the tensile test according to the above measuring method. Further, after the punched JIS-No.3 dumbbell type specimens were aged for 500 hours in an air oven kept at 130° C., they were subjected to the measurement of tensile strength and elongation at break in the same way as described above. After the aging, change in appearance was visually ascertained and at the same time the color difference (ΔE) of samples before and after the aging was measured with a Hunter color-difference meter to evaluate discoloration due to the heat aging. Further, the gel content was measured according to the previously described method, and also the bleed-out property was evaluated. The results are shown in Table 1.

EXAMPLE 5

Except for adding 0.1 part by weight of bis(2,6-di-tert-butyl-4-methylphenyl)pentaerythritol-di-phosphite as phosphorus-containing heat stabilizer in place of the sulfur-containing heat stabilizer in Example 4, the same as Example 4 was done to prepare pellets of a thermoplastic elastomer and the evaluation was conducted in the same manner as Example 4. The results are shown in Table 1.

EXAMPLE 6

Except for adding 0.2 part by weight of the phenolic heat stabilizer and not using the sulfur-containing heat stabilizer in Example 4, the same as Example 4 was done to prepare pellets of a thermoplastic elastomer and the evaluation was conducted in the same manner as Example 4. The results are shown in Table 1.

EXAMPLE 7

Except for using the oil-extended ethylene-propylene-dicyclopentadiene copolymer rubber (B-3) in place of the oil-extended ethylene-propylene-dicyclopentadiene copolymer rubber (B-2) used in Example 4, the same as Example 4 was done to prepare pellets of a thermoplastic elastomer and the evaluation was conducted in the same manner as Example 4. The results are shown in Table 1.

EXAMPLE 8

Except for using the oil-extended ethylene-propylene-dicyclopentadiene copolymer rubber (B-3) in place of the oil-extended ethylene-propylene-dicyclopentadiene copolymer rubber (B-2) used in Example 5, the same as Example 5 was done to prepare pellets of a thermoplastic elastomer and the evaluation was conducted in the same manner as Example 4. The results are shown in Table 1.

EXAMPLE 9

Except for using the oil-extended ethylene-propylene-dicyclopentadiene copolymer rubber (B-3) in place of the oil-extended ethylene-propylene-dicyclopentadiene copolymer rubber (B-2), using 0.2 part by weight of the phenolic heat stabilizer and not adding the sulfur-containing heat stabilizer in Example 4, the same as Example 4 was done to prepare pellets of a thermoplastic elastomer and the evaluation was conducted in the same manner as Example 4. The results are shown in Table 1.

Comparative Example 1

Except for not adding the phenolic heat stabilizer and the sulfur-containing heat stabilizer in Example 1, the same as Example 1 was done to prepare pellets of a thermoplastic elastomer and the evaluation was conducted in the same manner as Example 1. The results are shown in Table 1.

Comparative Example 2

Except for not adding the phenolic heat stabilizer and the sulfur-containing heat stabilizer in Example 2, the same as Example 2 was done to prepare pellets of a thermoplastic elastomer and the evaluation was conducted in the same manner as Example 2. The results are shown in Table 1.

Comparative Example 3

Except for not adding the phenolic heat stabilizer in Example 2, the same as Example 2 was done to prepare pellets of a thermoplastic elastomer and the evaluation was conducted in the same manner as Example 2. The results are shown in Table 1.

Comparative Example 4

Except for not adding the phenolic heat stabilizer and the sulfur-containing heat stabilizer in Example 4, the same as Example 4 was done to prepare pellets of a thermoplastic elastomer and the evaluation was conducted in the same manner as Example 4. The results are shown in Table 1.

Comparative Example 5

Except for not adding the phenolic heat stabilizer and using 0.2 part by weight of the sulfur-containing heat stabilizer in Example 4, the same as Example 4 was done to prepare pellets of a thermoplastic elastomer and the evaluation was conducted in the same manner as Example 4. The results are shown in Table 1.

TABLE 1

| | Example | | | | | | | | |
|---|---|---|---|---|---|---|---|---|---|
| | 1 | 2 | 3 | 4 | 5 | 6 | 7 | 8 | 9 |
| Oil | PW-380 | PS-430 | PS-430 | PS-430 | PS-430 | PS-430 | PW-380 | PW-380 | PW-380 |
| Phenolic heat stabilizer | 0.1 | 0.1 | 0.1 | 0.1 | 0.1 | 0.2 | 0.1 | 0.1 | 0.2 |
| Sulfur-containing heat stabilizer | 0.1 | 0.1 | | 0.1 | | | 0.1 | | |

TABLE 1-continued

| | | | | | | | | |
|---|---|---|---|---|---|---|---|---|
| Phosphorus-containing heat stabilizer | | 0.1 | | 0.1 | | | 0.1 | |
| Tensile strength before aging (kg/cm²) | 82 | 95 | 94 | 95 | 94 | 96 | 95 | 94 | 96 |
| Elongation at break before aging (%) | 580 | 610 | 600 | 610 | 600 | 630 | 610 | 600 | 630 |
| Tensile strength after aging (kg/cm²) | 84 | 97 | 92 | 97 | 92 | 97 | 95 | 95 | 97 |
| Tensile strength after aging (% retention) | 102 | 102 | 96 | 102 | 96 | 101 | 100 | 101 | 102 |
| Elongation at break after aging (%) | 580 | 620 | 580 | 620 | 580 | 640 | 620 | 620 | 650 |
| Elongation at break after aging (% retention) | 100 | 102 | 97 | 102 | 97 | 102 | 103 | 105 | 105 |
| Appearance after aging | no change | no change | black specks | no change | black specks | no change | no change | no change | no change |
| Color difference (ΔE) | 7.8 | 6.7 | 7.2 | 6.7 | 6.9 | 6.4 | 5.2 | 5.5 | 4.8 |
| Gel content (%) | 95 | 91 | 91 | 91 | 91 | 91 | 91 | 91 | 91 |
| Bleed-out | 2 | 3 | 3 | 3 | 3 | 2 | 2 | 2 | 1 |

| | Comparative example | | | | |
|---|---|---|---|---|---|
| | 1 | 2 | 3 | 4 | 5 |
| Oil | PW-380 | PS-430 | PS-430 | PS-430 | PS-430 |
| Phenolic heat stabilizer | | | | | |
| Sulfur-containing heat stabilizer | | | 0.1 | | 0.2 |
| Phosphorus-containing heat stabilizer | | | | | |
| Tensile strength before aging (kg/cm²) | 85 | 98 | 95 | 98 | 95 |
| Elongation at break before aging (%) | 600 | 630 | 610 | 630 | 610 |
| Tensile strength after aging (kg/cm²) | 54 | 25 | 67 | 25 | 67 |
| Tensile strength after aging (% retention) | 64 | 26 | 71 | 26 | 71 |
| Elongation at break after aging (%) | 340 | 140 | 400 | 140 | 400 |
| Elongation at break after aging (% retention) | 57 | 22 | 66 | 22 | 66 |
| Appearance after aging | no change | no change | no change | no change | no change |
| Color difference (ΔE) | 14.1 | 16.3 | 10.4 | 16.3 | 10.4 |
| Gel content (%) | 96 | 92 | 91 | 92 | 91 |
| Bleed-out | 3 | 3 | 3 | 3 | 3 |

In Examples 3 and 5, black specks were generated on the samples owing to the aging.

All the publications, patents and patent applications cited herein are incorporated herein by reference in their entirety.

Industrial Applicability

By employing the thermoplastic elastomer composition of the present invention, high heat-aging resistant moldings can be provided.

What is claimed is:

1. A thermoplastic elastomer composition which comprises 10 to 60 parts by weight of a polyolefin (A), 30 to 87 parts by weight of a crosslinked rubber (B), 3 to 50 parts by weight of a softening agent (C) wherein the total amount of (A), (B) and (C) is 100 parts by weight and 0.02 to 0.3 part by weight of a phenolic heat stabilizer (D) and which retains an elongation value at break by 80% or more, after aging for 500 hours in an air oven to 130° C., of the value before the aging, wherein the polyolefin (A) is selected from the group consisting of isotactic polyolefins and syndiotactic polyolefins.

2. A thermoplastic elastomer composition as defined in claim 1, wherein the softening agent (C) is a paraffinic mineral oil.

3. A thermoplastic elastomer composition as defined in claim 1 or 2, wherein the softening agent (C) has an aniline point of 140° C. or below and a sulfur content of 20 ppm or more.

4. A thermoplastic elastomer composition as defined in claim 1, wherein the softening agent (C) has a kinetic viscosity of 150 to 1000 cSt at 40° C.

5. A thermoplastic elastomer composition as defined in claim 1, which further contains 0.02 to 0.3 part by weight of a heat stabilizer other than the phenolic type.

6. A thermoplastic elastomer composition as defined in claim 5, wherein the heat stabilizer other than the phenolic type is a sulfur-containing heat stabilizer.

7. A thermoplastic elastomer composition as defined in claim 1, which is produced by dynamically heat treating at least the whole of the crosslinked rubber (B) and part or the whole of the polyolefin (A) in the presence of a crosslinking agent.

8. A thermoplastic elastomer composition as defined in claim 1, wherein the crosslinked rubber (B) is at least one rubber selected from the group consisting of ethylene-α-olefin-non-conjugated polyene copolymer rubbers, ethylene-α-olefin copolymer rubbers, isoprene rubbers or hydrogenated products thereof, butadiene rubbers or hydrogenated products thereof, styrene-butadiene rubbers or hydrogenated products thereof, styrene-isoprene rubbers or hydrogenated products thereof, chloroprene rubbers, butyl rubbers, halogenated butyl rubbers, acrylonitrile-butadiene rubbers, chlorinated polyethylene rubbers, fluororubbers, silicone rubbers, polysulfide rubbers and urethane rubbers.

9. A thermoplastic elastomer composition as defined in claim 1, wherein the polyolefin (A) is a polymeric resin based on propylene and the crosslinked rubber (B) is an ethylene-α-olefin-non-conjugated polyene copolymer rubber.

10. A thermoplastic elastomer composition as defined in claim 1, wherein the rubber is crosslinked by an organic peroxide.

11. A thermoplastic elastomer composition as defined in claim 1, which is produced by using a twin screw extruder.

12. A method for producing the thermoplastic elastomer composition as defined in claim 1, which comprises dynamically heat treating 10 to 60 parts by weight of a polyolefin (A), 30 to 87 parts by weight of a rubber (B), 3 to 50 parts by weight of a softening agent (C) wherein the total amount of (A), (B) and (C) is 100 parts by weight and 0.02 to 0.3 part by weight of a phenolic heat stabilizer (D) in the presence of a crosslinking agent.

13. The composition of claim 1, wherein the polyolefin is isotactic.

14. The composition of claim 1, wherein the polyolefin is polypropylene.

15. The composition of claim 1, wherein the polyolefin is isotactic polypropylene.

* * * * *